(12) United States Patent
Chen et al.

(10) Patent No.: US 8,736,185 B2
(45) Date of Patent: May 27, 2014

(54) SCR DIMMING CIRCUIT AND METHOD

(75) Inventors: Shenglun Chen, Hangzhou (CN); Wei Chen, Saratoga, CA (US); Xiaoru Xu, Hangzhou (CN)

(73) Assignee: Sileroy Semiconductor Technology (Hangzhou) Ltd., Hangzhou (CN)

( * ) Notice: Subject to any disclaimer, the term of this patent is extended or adjusted under 35 U.S.C. 154(b) by 331 days.

(21) Appl. No.: 13/411,738

(22) Filed: Mar. 5, 2012

(65) Prior Publication Data
US 2012/0256553 A1 Oct. 11, 2012

(30) Foreign Application Priority Data
Apr. 8, 2011 (CN) .......................... 2011 1 0089211

(51) Int. Cl.
*H05B 37/02* (2006.01)
(52) U.S. Cl.
USPC ........ 315/205; 315/200 R; 315/287; 315/291; 315/307
(58) Field of Classification Search
USPC .................... 315/200 R, 205, 287, 291, 307
See application file for complete search history.

(56) References Cited

U.S. PATENT DOCUMENTS

| | | | |
|---|---|---|---|
| 8,552,942 B2 * | 10/2013 | Hua et al. ......................... | 345/82 |
| 8,581,518 B2 * | 11/2013 | Kuang et al. .................. | 315/307 |
| 2011/0127925 A1 * | 6/2011 | Huang et al. .................. | 315/287 |

FOREIGN PATENT DOCUMENTS

| | | |
|---|---|---|
| CN | 101605413 A | 12/2009 |
| CN | 201509346 U | 6/2010 |
| CN | 101835314 A | 9/2010 |

* cited by examiner

*Primary Examiner* — Douglas W Owens
*Assistant Examiner* — Thai Pham
(74) *Attorney, Agent, or Firm* — Michael C. Stephens, Jr.

(57) ABSTRACT

The present invention relates to an SCR dimming circuit and method for regulating the luminance of an LED load. In one embodiment, an SCR dimming circuit can include: an SCR element that generates a lack-phase AC voltage based on a sinusoidal AC supply; a rectifier bridge that generates a lack-phase DC voltage based on the lack-phase AC voltage; a conduction angle generator that receives the lack-phase DC voltage, and generates a controlling signal representative of a conduction angle of the SCR element; and a dimming signal generator that generates a dimming signal to regulate luminance of the LED load, where the dimming signal generator receives the controlling signal, an adjustable signal, and a clamping voltage, an amplitude of a dimming phase angle range is selected by a fixed signal determined by the clamping voltage, and the dimming phase angle range may be shifted by regulating the adjustable signal.

20 Claims, 10 Drawing Sheets

SCR DIMMING CIRCUIT AND METHOD

RELATED APPLICATIONS

This application claims the benefit of Chinese Patent Application No. CN201110089211.3, filed on Apr. 8, 2011, which is incorporated herein by reference in its entirety.

FIELD OF THE INVENTION

The present invention generally pertains to a dimming circuit for a lamp load, and more particularly to a silicon-controlled rectifier (SCR) dimming circuit for a light-emitting diode (LED) load.

BACKGROUND

In the field of lighting, and in view of the advantages of smaller size, more preferable price, and wider dimming range, silicon-controlled rectifier (SCR) dimming schemes are widely used. For example, applications include stage lighting, directional lighting, and surrounding illumination. By controlling a conduction phase angle of an SCR element, a part of the input sine wave of an AC power supply may be cut off to decrease average voltage value to control the supply to the lamp load, thus achieving dimming operation. However, drawbacks of conventional SCR dimming circuits include relatively low efficiency, flicker, and questionable dimming performance.

SUMMARY

In one embodiment, an SCR dimming circuit can include: (i) an SCR element configured to generate a lack-phase AC voltage based on a sinusoidal AC supply; (ii) a rectifier bridge configured to generate a lack-phase DC voltage based on the lack-phase AC voltage; (iii) a conduction angle generator coupled to the rectifier bridge, where the conduction angle generator is configured to receive the lack-phase DC voltage, and to generate a controlling signal that is representative of a conduction angle of the SCR element; and (iv) a dimming signal generator coupled to the conduction angle generator and being configured to generate a dimming signal to regulate luminance of an LED load in accordance with the lack-phase DC voltage, where the dimming signal generator is configured to receive the controlling signal, an adjustable signal, and a clamping voltage, where an amplitude of a dimming phase angle range is selected by a fixed signal determined by the clamping voltage, and where the dimming phase angle range is configured to be shifted by regulating the adjustable signal.

In one embodiment, an LED driver can include: (i) the SCR dimming circuit; and (ii) a power stage coupled, via an output voltage, to an LED; (iii) an error amplifying circuit configured to receive the dimming signal and a feedback signal representative of the output voltage, and to generate an error signal; and (iv) a logic and driving circuit configured to receive the error signal, and to generate a driving signal to drive the power stage, where a luminance of the LED is configured to be regulated by the dimming signal.

In one embodiment, an SCR dimming method for regulating luminance of an LED load, can include: (i) converting an external sinusoidal AC power supply to a lack-phase AC voltage; (ii) converting the lack-phase AC voltage to a lack-phase DC voltage; (iii) converting the lack-phase DC voltage to a controlling signal representing a conduction angle of an SCR element; (iv) generating a dimming signal in response to the controlling signal, an adjustable signal, and a clamping voltage; (v) selecting an amplitude of a dimming phase angle range a fixed signal that is determined by the clamping voltage; and (vi) shifting the dimming phase angle range by regulating the adjustable signal.

Embodiments of the present invention can advantageously provide several advantages over conventional approaches. Particular embodiments may provide a dimming phase angle range that is selectable at a voltage at a corresponding phase angle that is higher, which can achieve a higher efficiency, better dimming performance, and no flickering of an LED load. Also, more SCR elements with different start-up phase angles can be accommodated by regulation of the dimming phase angle range. In addition, the dimming phase angle range can be modulated to a front half section of a half sinusoidal waveform, such as from a phase angle from about 30° to about 90° to achieve a highest power factor. Other advantages of the present invention will become readily apparent from the detailed description of preferred embodiments below.

DETAILED DESCRIPTION

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device and/or memory. These descriptions and representations are generally used by those skilled in the data processing arts to effectively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Embodiments of the present invention can advantageously provide several advantages over conventional approaches. Particular embodiments may provide a dimming phase angle range that is selectable at a voltage at a corresponding phase angle that is higher, which can achieve a higher efficiency, better dimming performance, and no flickering of an light-emitting diode (LED) load. Also, more silicon-controlled rectifier (SCR) elements with different start-up phase angles can be accommodated by regulation of the dimming phase angle range. In addition, the dimming phase angle range can be modulated to a front half section of a half sinusoidal waveform, such as from a phase angle from about 30° to about 90° to achieve a highest power factor. The invention, in its various aspects, will be explained in greater detail below with regard to exemplary embodiments.

Figure 1A:
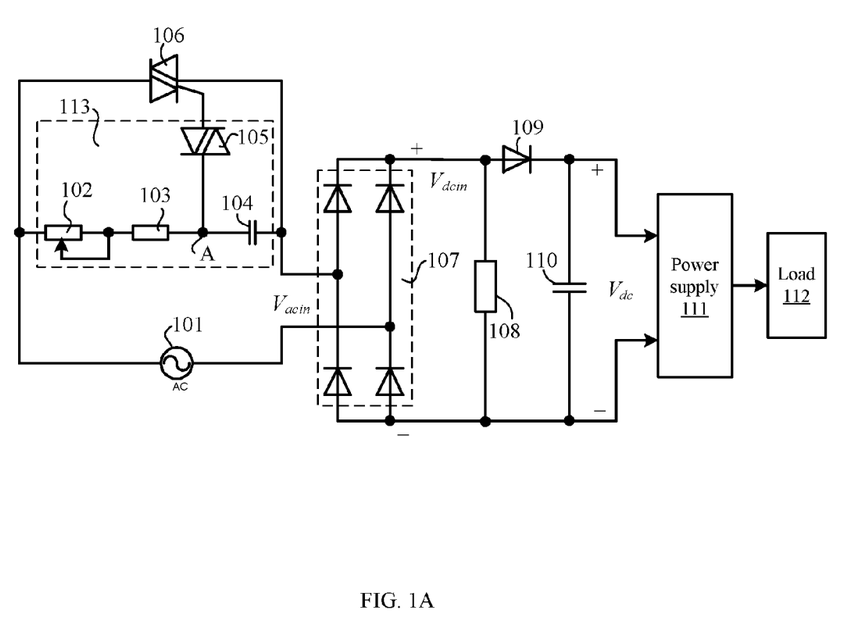
FIG. 1A is a schematic diagram of an example SCR dimming circuit.

With reference to FIG. 1A, a schematic diagram of an example SCR dimming circuit is shown. In this particular example, the SCR dimming circuit can include AC input supply 101, SCR element 106, trigger 113, rectifier bridge 107, holding resistor 108, and a filter including diode 109 and filter capacitor 110. Here, trigger 113 further can include bi-directional trigger diode (TRIAC) 105 and 106, adjustable resistor 102, resistor 103, and capacitor 104. The anode of SCR element 106 can connect to one terminal of AC power supply 101, while the cathode can connect to rectifier bridge 107. Node A may be formed by a connection of resistor 103 and capacitor 104, and may be coupled to controlling terminal of SCR element 106 through SCR element 105.

In operation, a voltage of a controlling terminal of SCR element 106 may be controlled by adjusting a resistance of adjustable resistor 102. When the voltage of the controlling terminal is higher than a threshold, SCR element 106 can begin to conduct. The phase angle of the AC input supply at which SCR element 106 begins to conduct may be controlled.

Figure 1B:
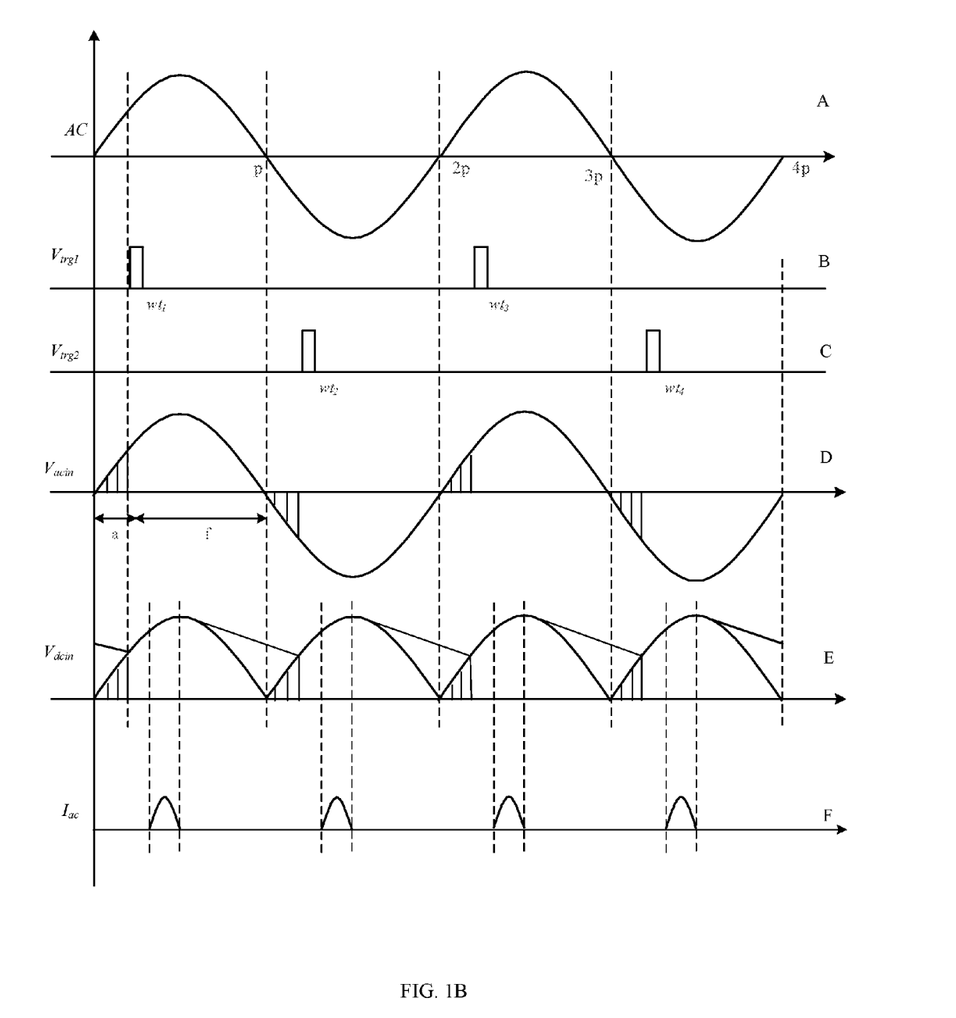
FIG. 1B is a waveform diagram showing example operation of the SCR dimming circuit of FIG. 1A.

With reference to waveforms of FIG. 1B that employ a leading edge trigger scheme, at time $t_1$ (phase angle $w_{t1}$) after the voltage of sinusoidal AC input supply 101 crosses zero, a positive trigger pulse $V_{ctrg1}$ may be supplied to the controlling terminal of SCR element 106 in order to trigger SCR element 106 to conduct. In accordance with SCR element characteristics, the conduction status may last until the end of a positive half sine wave. SCR element 106 may be off within the control angle α (phase angle range $0 \sim w_{t1}$) during the positive half sinusoidal wave (phase angle range $0 \sim \pi$).

SCR element 106 may be on within the conduction angle φ (phase angle range $w_{t1} \sim \pi$ as shown by inclined lines). While in the negative half sine wave, trigger pulse $V_{trg2}$ can be supplied at time $t_2$ (phase angle $w_{t2}$) to make SCR element 106 conduct. Thus, conduction angle φ (controlling angle α) can be controlled by alteration of triggering time (or phase angle) of a trigger pulse to obtain a lack-phase AC voltage $V_{acin}$. A DC voltage $V_{dcin}$ can be achieved by rectifying the lack-phase AC voltage through rectifier bridge 107. The larger the conduction angle φ is, the higher output voltage $V_{dc}$ is, which may bring a higher luminance for lamp load 112 through power supply driver 111.

A conventional AC/DC converting LED driver may be shut down due to a defect that the SCR element may be turned off when the sinusoidal AC input voltage crosses a zero point, which can lead to the failure to drive LED load. When the SCR dimming circuit is in the condition of a relatively low conduction angle, the short conduction time of the LED load at the twice frequency condition can be observed by human eyes, possibly resulting in the flickering of LED.

An SCR dimming circuit can accommodate an SCR element by arranging element parameters of the dimming circuit in accordance with the parameter of SCR element to achieve a better dimming performance. For example, an SCR dimming circuit may be adjusted for a different SCR element having a conduction angle that varies correspondingly to avoid the decrease of dimming performance. However, for an SCR dimming circuit employed for an SCR element with a dimming phase angle range from 60° to 120°, the same SCR dimming circuit may not be available for another SCR element with the start-up phase angle 75°, which may lead to decrease of an adjustable luminance range for the LED load.

In one embodiment, an SCR dimming circuit can include: (i) an SCR element configured to generate a lack-phase AC voltage based on a sinusoidal AC supply; (ii) a rectifier bridge configured to generate a lack-phase DC voltage based on the lack-phase AC voltage; (iii) a conduction angle generator coupled to the rectifier bridge, where the conduction angle generator is configured to receive the lack-phase DC voltage, and to generate a controlling signal that is representative of a conduction angle of the SCR element; and (iv) a dimming signal generator coupled to the conduction angle generator and being configured to generate a dimming signal to regulate luminance of an LED load in accordance with the lack-phase DC voltage, where the dimming signal generator is configured to receive the controlling signal, an adjustable signal, and a clamping voltage, where an amplitude of a dimming phase angle range is selected by a fixed signal determined by the clamping voltage, and where the dimming phase angle range is configured to be shifted by regulating the adjustable signal.

Figure 2:
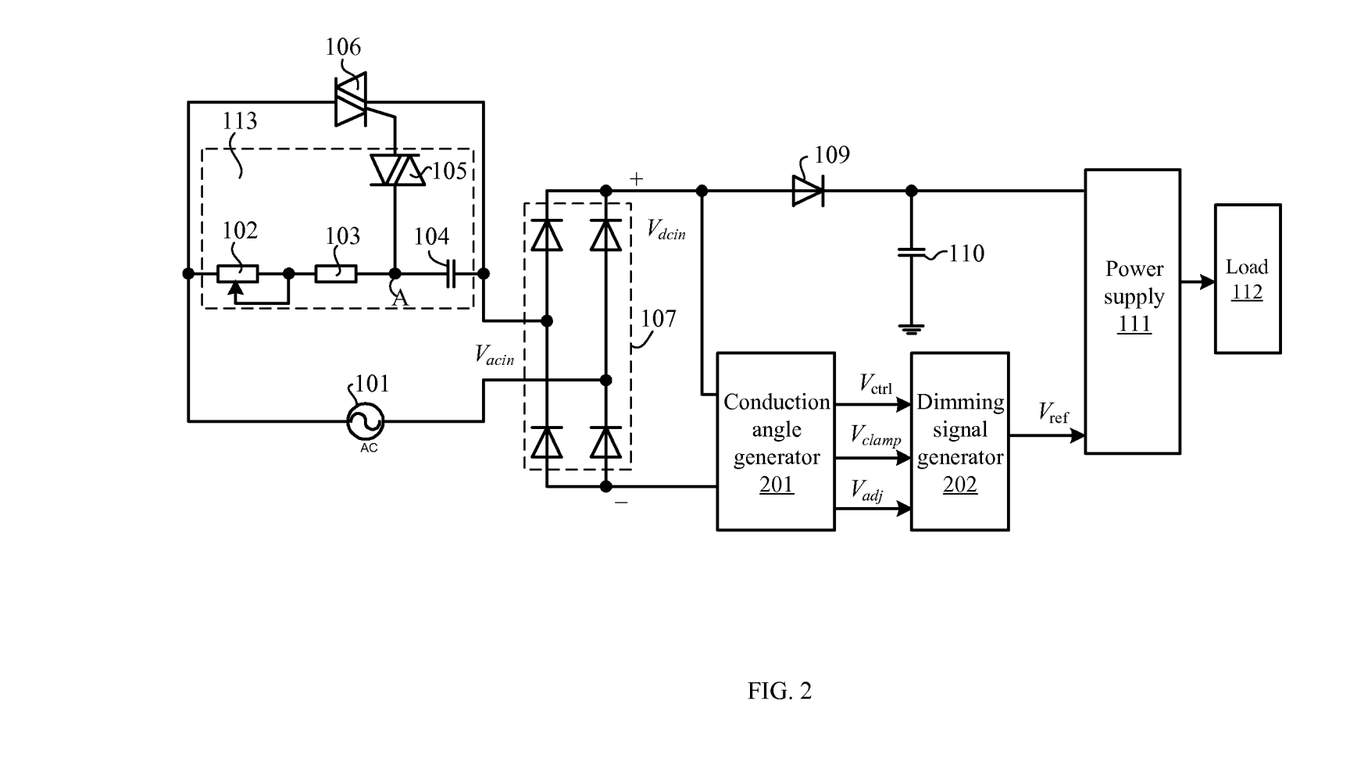
FIG. 2 is a schematic diagram of a first example SCR dimming circuit in accordance with embodiments of the present invention.

Referring now to FIG. 2, shown is a first example SCR dimming circuit in accordance with embodiments of the present invention. In this example, conduction angle generator 201 and dimming signal generator 202 may be included. Conduction angle generator 201 may be coupled to rectifier bridge 107 to detect the lack-phase DC voltage $V_{dcin}$ to generate a controlling signal $V_{ctrl}$ that indicates the conduction angle of SCR element 106. Dimming signal generator 202 can receive the controlling signal $V_{ctrl}$, an adjustable signal $V_{adj}$, and a clamping voltage $V_{clamp}$ to generate a dimming signal $V_{ref}$. The amplitude of a dimming phase angle range can be determined by a fixed signal $V_{fix}$ that is determined by the clamping voltage. Also, the dimming phase angle range can be shifted by regulating the amplitude of dimming signal $V_{ref}$, which may be achieved by adjusting the adjustable signal $V_{adj}$.

The relationship of dimming signal $V_{ref}$, adjustable signal $V_{adj}$, controlling signal $V_{ctrl}$ and clamping voltage $V_{clamp}$ may be as follows. When the adjustable signal $V_{adj}$ is higher than controlling signal $V_{ctrl}$, dimming signal $V_{ref}$ can be at the minimum value and LED may be in a minimum luminance status (such as off). When the difference of controlling signal $V_{ctrl}$ and adjustable signal $V_{adj}$ is higher than fixed signal $V_{fix}$, dimming signal $V_{ref}$ may be at a maximum value and LED can be in a maximum luminance status (such as full brightness). When adjustable signal $V_{adj}$ is between a difference of controlling signal $V_{ctrl}$ and fixed signal $V_{fix}$ and controlling signal $V_{ctrl}$, dimming signal $V_{ref}$ may be between the maximum value and minimum value, and luminance of the LED can be between minimum luminance and maximum luminance, which may be in a dimming status.

Thus, the value of adjustable signal $V_{adj}$ can determine the amplitude of a cut-off phase angle range during which the LED is off, and fixed signal $V_{fix}$ may determine the amplitude of the dimming phase angle range. If the original dimming phase angle range of the SCR dimming circuit is from about 20° to slightly lower than about 180° (e.g., from about 20° to about 150°), the LED can be in a maximum luminance status at a phase angle of about 20°, while in a minimum luminance status at a phase angle of about 150°. At a voltage corresponding to a phase angle of about 150° and about 20° of sinusoidal wave that is lower, resistor 108 may be sufficiently low to ensure enough holding current of the SCR element, which can to lower efficiency and a problem of flickering of the LED.

For the example SCR dimming circuit of FIG. 2 in accordance with one embodiments of the present invention, the amplitude of the cut-off phase angle range can be modulated by the regulation of adjustable signal $V_{adj}$. If the amplitude of cut-off phase angle range is about 60°, the LED will be turned off (minimum luminance) in the range from a phase angle from about 120° to about 180°. An amplitude of the dimming phase angle range may be determined by fixed signal. The dimming phase angle range may be modulated to a range from a phase angle of from about 60° to about 120° if the amplitude of the dimming phase angle range is about 60° as determined by fixed signal $V_{fix}$. The value of a sinusoidal voltage corresponding to which may be sufficient to obtain enough holding current for the SCR element without use of resistor 108, or with replacement of a higher-resistance resistor.

Furthermore, for the example SCR dimming circuit of FIG. 1A, on the condition that a start-up phase angle for a new SCR element changes to about 30°, the dimming phase angle range can be from about 30° to about 150° phase angle if the original dimming circuit is still utilized, which can decrease the dimming phase angle range. Also, a, range of luminance of the LED may change to a range from the luminance corresponding to phase angle of about 30° to minimum luminance, thus decreasing the luminance range.

In the example SCR dimming circuit of FIG. 2, by regulation of adjustable signal $V_{adj}$ and fixed signal $V_{fix}$, the dimming phase angle range can be shifted to range from a phase angle of from about 30° to about 160° to ensure that an adjustable luminance range of LED keeps substantially constant. This may mean that maximum luminance of the LED occurs at phase angle of about 30°, and minimum luminance occurs at phase angle of about 160°.

Also, for a switching mode power supply, a capacitor with large capacitance may be necessary to filter the DC voltage output by rectifier bridge 107, to generate a smooth DC voltage to provide supply for circuitry that follows. Current may only exist during the phase angle range from about 0° to about 90° (first half section of sinusoidal half-wave) due to use of filter capacitor 110, and current conduction phase angle range may be smaller (e.g., from phase angle 30° to 90°, etc.), as the "F" section shown in FIG. 1B. Because the second half of a sinusoidal half-wave (e.g., from phase angle 60° to 120°, etc.) may be encapsulated to most dimming phase angle ranges, there may be no current during the range from about 90° to about 120°, which can decrease the power factor.

In the example of FIG. 2, the dimming phase angle range can be shifted to a range for the phase angle from about 30° to about 90° by regulating adjustable signal $V_{adj}$ and fixed signal $V_{fix}$ to obtain a higher power factor than other phase angle ranges.

Figure 3A:
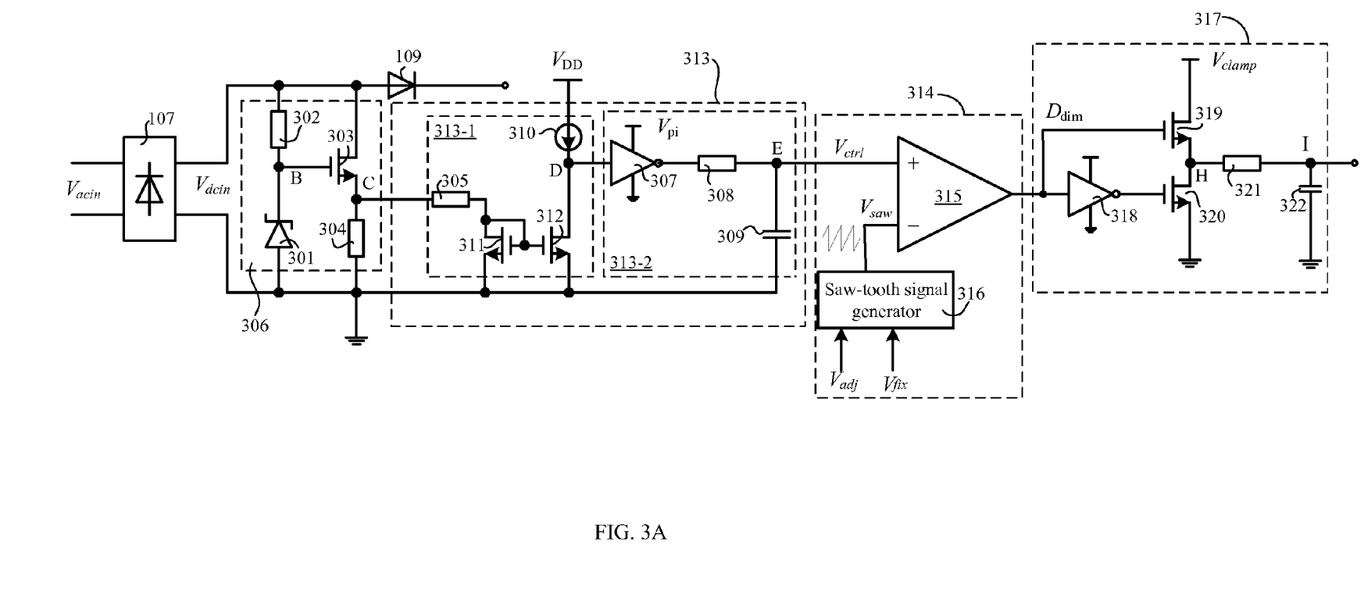
FIG. 3A is a schematic diagram of a second SCR dimming circuit in accordance with embodiments of the present invention.

With reference to FIG. 3A, a schematic diagram of a second example SCR dimming circuit in accordance with embodiments of the present invention is shown. Here, conduction angle generator 201 can include phase angle detector 306 and controlling signal generator 313, and dimming signal generator 202 can include comparator 314 and averaging circuit 317.

Phase angle detector 306 can receive lack-phase DC voltage $V_{dcin}$ of rectifier bridge 107 to generate a detection voltage indicating conduction angle φ of SCR element, which may be a square wave signal. The detection voltage can be converted to a controlling signal by controlling signal generator 313 in proportion with conduction angle φ of SCR element, which can be a smooth DC signal.

Comparator 314 (e.g., including comparator 315 and saw-tooth signal generator 316) may receive both controlling signal $V_{ctrl}$ and a saw-tooth wave signal $V_{saw}$ to generate a square wave signal. In this example, the peak-to-peak value of the saw-tooth wave signal $V_{saw}$ may be a fixed value, and a valley of which can be adjusted to regulate the duty cycle of the square wave signal. Also, the frequency of the saw-tooth signal $V_{saw}$ can be set as a higher value to improve the frequency of the square wave signal, which can decrease the parameters of following circuit elements to facilitate the integration. The square wave signal may be averaged by averaging circuit 317 to generate the dimming signal to regulate luminance of LED.

Furthermore, phase angle detector 306 can include resistor 302 and zener diode 301 coupled in series with common node B between two output terminals of rectifier bridge 107; and transistor 303 and resistor 304 can be coupled in series with common node C between two output terminals of rectifier bridge 107. In the example that transistor 303 is an N-type MOSFET (NMOS) transistor, a gate of transistor 303 may be coupled to node B, a drain of transistor 303 can be coupled to a first output terminal of rectifier bridge 107, and source of transistor 303 may be coupled to resistor 304.

After SCR element 106 conducts, and a voltage of a first output terminal of rectifier bridge 107 is higher than a breakdown voltage of the zener diode, a voltage of node B can be clamped to the breakdown voltage of the zener diode. Then, transistor 303 may be turned on to generate detection voltage $V_{on}$ at node C (e.g., with a shape of square wave), the holding time of which is about the conduction time of SCR element 106.

The controlling signal generator 313 can include square wave signal generator 313-1 and filtering circuit 313-2. Here, detection voltage $V_{on}$ can be converted to a first square wave signal by square wave signal generator 313-1, and the interval of high level or low level of which can the conduction phase angle range of the SCR element. The first square wave signal may be filtered by filtering circuit 313-2 to generate a smooth controlling signal $V_{ctrl}$ in proportion with the conduction angle of the SCR element.

The square wave signal generator 313-1 can include resistor 305, transistor 311, transistor 312, and current source 310. Transistor 311 and transistor 312 may be back-to back connected. In the example that transistor 311 and transistor 312 are NMOS transistors, one terminal of resistor 305 can be coupled to node C, the other terminal of resistor 305 may be separately coupled to the gate and drain of transistor 311, and the gate of transistor 312. The drain of transistor 312 can be coupled to current source 310 at common node D. Also, the sources of both transistor 311 and transistor 312 can be coupled to a second output terminal of rectifier bridge 107.

When a voltage of node C is higher than a threshold voltage of transistor 311, transistor 311 may be turned on, and current can flow through transistor 311, which may be mirrored by transistor 312. When the mirrored current is higher than the current of current source 310, a voltage of node D may be low. However, when the mirrored current is lower than the current of current source 310, a voltage of node D may be high. In this way, the first square wave signal can be generated at node D, where a holding interval of the low level indicates the conduction angle of the SCR element.

Filtering circuit 313-2 can include first inverter 307, resistor 308, and capacitor 309. The input terminal of inverter 307 can receive the first square wave signal, and the output terminal may be coupled to resistor 308 and capacitor 309 in series to filter the first square wave signal. Controlling signal $V_{ctrl}$ can be generated at common node E of resistor 308 and capacitor 309. If the input voltage of inverter 307 is $V_{pi}$, and the conduction angle of SCR element is $\phi$, the value of controlling signal $V_{ctrl}$ can be calculated as in formula (1).

$$V_{ctrl} = \frac{V_{pi} \times \varphi}{\pi} \tag{1}$$

The above-mentioned square wave signal generator 313-1 can be implemented through a current comparison mode. However, one skilled in the art can recognize that voltage comparison mode can also be utilized in accordance with embodiments. For example, the detection voltage and a voltage reference may be compared by a comparator to generate the first square wave signal indicating the conduction angle of the SCR element.

Comparator 314 of dimming signal generator 202 can include comparator 315 and saw-tooth signal generator 316. The non-inverting input terminal of comparator 315 can receive the controlling signal $V_{ctrl}$, and the inverting input terminal may receive saw-tooth signal $V_{saw}$. Saw-tooth signal generator 316 can receive adjustable signal $V_{adj}$ and fixed signal $V_{fix}$ to adjust the valley and maintain a substantially constant peak-to-peak value of the saw-tooth signal.

Figure 3B:
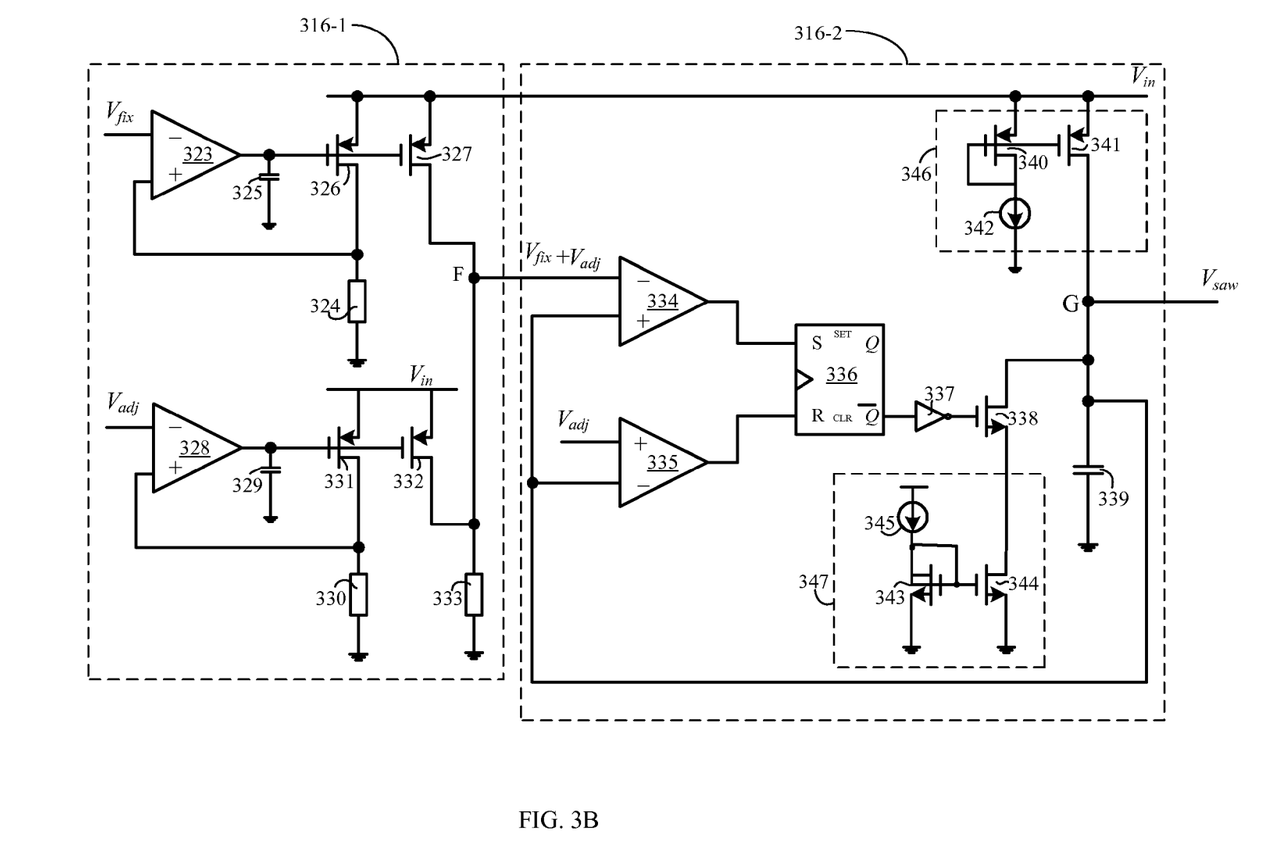
FIG. 3B is a schematic diagram of an example saw-tooth signal generator of an example SCR dimming circuit in accordance with embodiments of the present invention.

With reference to FIG. 3B, a schematic diagram of a saw-tooth signal generator 316 in accordance with embodiments of the present invention is shown. This example saw-tooth signal generator can include sum circuit 316-1 and charge-discharge circuit 316-2.

Sum circuit 316-1 can include a fixed signal converter and an adjustable signal converter. The fixed signal converter can include amplifier 323, resistor 324, capacitor 325, and transistor 326. The inverting input terminal of amplifier 323 can receive fixed signal $V_{fix}$, and the non-inverting input terminal may be coupled to one terminal of resistor 324 and drain of transistor 326, and the other terminal of resistor 324 may be grounded. The output terminal of amplifier 323 may be coupled to the gate of transistor 326, and the source of transistor 326 can be coupled to the input voltage $V_{in}$. Capacitor 325 can be coupled between the common node of output terminal of amplifier 323, the gate of transistor 326, and ground. Current flowing through drain of transistor 326 $I_{fix}$ can be calculated as and the following formula (2), in accordance with the "virtual short circuit" amplifier principal.

$$I_{fix} = V_{fix}/R_{324} \tag{2}$$

Similarly, the adjustable signal converter can include amplifier 328, resistor 330, capacitor 329, and transistor 331, with similar connections as described above with reference to the fixed signal converter. Current flowing through drain of transistor 331 can be calculated as in the following formula (3).

$$I_{adj} = V_{adj}/R_{330} \tag{3}$$

The gate of transistor 327 may be coupled to the gate of transistor 326, the source of transistor 327 can be coupled to input voltage, and drain may be coupled to one terminal of resistor 333 at the common node F, while the other terminal of resistor 333 may be grounded. Current $I_{fix}$ can be mirrored to generate a mirror current by transistor 327. The gate of transistor 332 can be coupled to the gate of transistor 331, the source of transistor 332 may be coupled to input voltage, and the drain can be coupled to common node F, a summing voltage $V_F$ with a value of $V_{fix}+V_{adj}$ generated at node F.

The inverting input terminal of comparator 334 may be coupled to voltage $V_F$, the non-inverting input terminal may be coupled to saw-tooth signal $V_{saw}$, and the output terminal may be coupled to set terminal S of SR flip-flop 336. The non-inverting input terminal of comparator 335 can be coupled to adjustable signal $V_{adj}$, the inverting input terminal may be coupled to saw-tooth signal $V_{saw}$, and the output terminal can be coupled to reset terminal R of SR flip-flop 336. An output terminal of flip-flop 336 may be coupled to the gate of transistor 338 through inverter 337. The drain of transistor 338 may be coupled to first current source 346 at common node G, and the source may be coupled to second current source 347. Capacitor 339 can be coupled between node G and ground, and a voltage of node G may be a saw-tooth signal $V_{saw}$, which can be coupled to comparator 315.

When saw-tooth voltage $V_{saw}$ is higher than adjustable signal $V_{adj}$, transistor 338 may be off, and capacitor can be charged by first current source 346, increasing the voltage. First current source 346 can include constant current source 342, transistor 340, and transistor 341 connected in mirroring mode. The sources of transistors 340 and 341 can be coupled to the input voltage, the drain of transistor 340 may be coupled to constant current source 342, and the drain of transistor 341 can be coupled to node G.

When saw-tooth voltage $V_{saw}$ reaches $V_{fix}+V_{adj}$, RS flip-flop 336 may flip to turn transistor 338 on, while capacitor 339 keeps discharging, and the voltage of node G may keep decreasing until reaching voltage $V_{adj}$, causing a reset of RS flip-flop 336. Capacitor 339 may recover to charge again, and as such a saw-tooth signal $V_{saw}$ may be generated with a valley as $V_{adj}$ and a peak as $V_{fix}+V_{adj}$.

In one example, a value of the second current source may be higher than the first current source to make the discharging interval shorter such that the decreasing rate is higher than the rising rate of the saw-tooth signal. Second current source 347 can include current source 345, transistor 343, and transistor 344. The drain of transistor 343 may be coupled to current source 345, and the source is coupled to ground. The gate of transistor 343, the gate of transistor 344, and the drain of transistor 343 can be connected together. The source of transistor 344 may be grounded, and the drain can be coupled to the source of transistor 338.

Figure 3C:
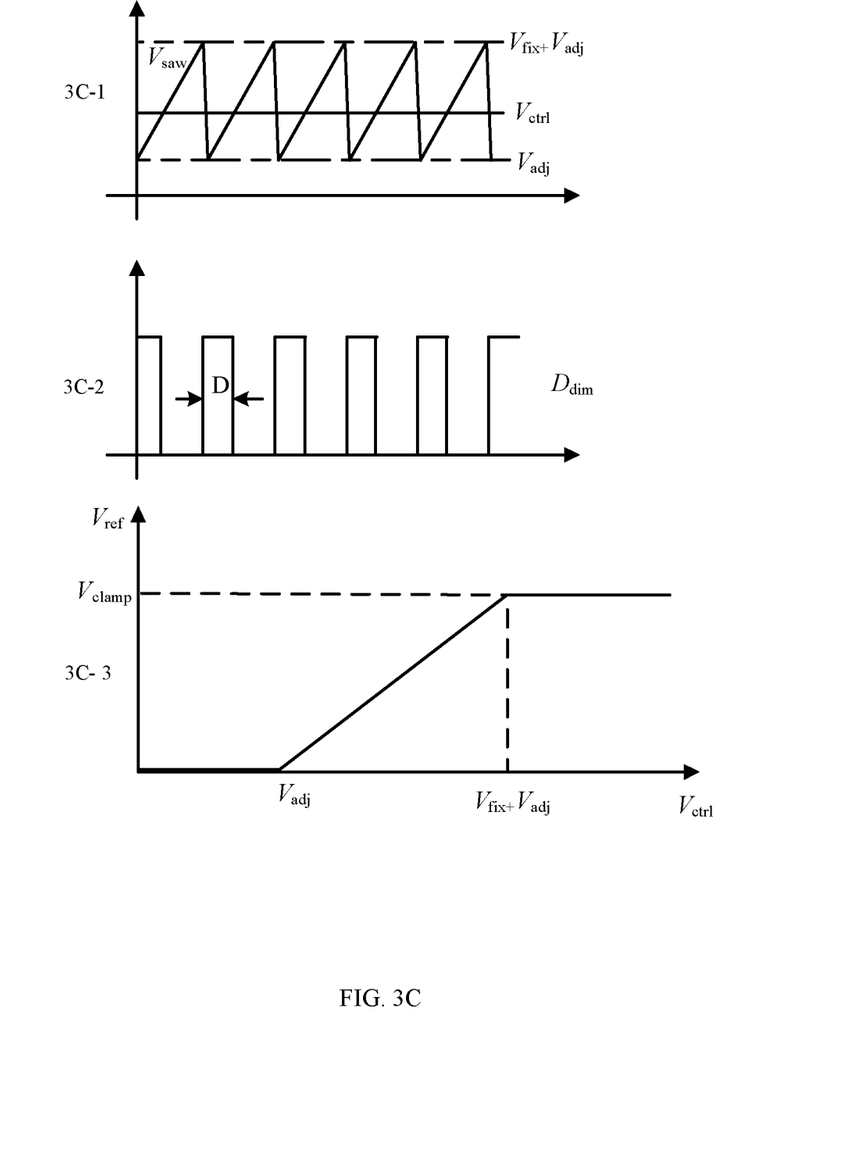
FIG. 3C is a waveform diagram showing example operation of the SCR dimming circuit of FIG. 3A and FIG. 3B.

Referring to waveforms 3C-1 and 3C-2 shown in FIG. 3C, comparator 315 can receive the controlling signal $V_{ctrl}$ and saw-tooth signal $V_{saw}$ to output second square wave signal $D_{dim}$ with duty cycle D. Averaging circuit 317 of dimming signal generator 202 can include second inverter 318, transistor 319, and transistor 320 connected in series with common node H between clamping voltage $V_{clamp}$ and ground. The input terminal of inverter 318 can receive second square wave signal $D_{dim}$, and the output terminal of inverter 318 can be coupled to the gate of transistor 320. Resistor 321 and capacitor 322 can be connected in series with common node I between mode H and ground. Also, a voltage of node I may be used as dimming signal $V_{ref}$, with a value as in formula (4):

$$V_{ref} = \min\left(V_{clamp}, \max\left(0, \frac{(V_{ctrl} - V_{adj})}{V_{fix}} \times V_{clamp}\right)\right) \quad (4)$$

The relationship of dimming signal $V_{ref}$, clamping voltage $V_{clamp}$, controlling signal $V_{ctrl}$, fixed signal $V_{fix}$, and adjustable signal $V_{adj}$ can be represented as shown in waveform of 3C-3 of FIG. 3C. Within the dimming phase angle range, dimming signal $V_{ref}$ can be represented as in formula (5):

$$V_{ref} = \frac{V_{pi} \times \varphi/\pi - V_{adj}}{V_{fix}} \times V_{clamp} \quad (5)$$

Adjustable signal $V_{adj}$ may be as indicated in formula (6):

$$V_{adj} = V_{pi}\phi/\pi = V_{ctrl} \quad (6)$$

When this is the case, the dimming signal may be zero, and luminance of the LED may be at the minimum value. In another example, adjustable signal $V_{adj}$ may be as in formula (7).

$$V_{adj} = V_{pi} \times \phi/\pi - V_{fix} = V_{ctrl} - V_{fix} \quad (7)$$

When this is the case, dimming signal $V_{ref}$ can be equal to clamping voltage $V_{clamp}$, and the luminance of the LED may be at the maximum value.

Controlling signal $V_{ctrl}$ and saw-tooth signal $V_{saw}$ can be compared by comparator 315 to generate second square wave signal $D_{dim}$, the duty cycle of which can be determined by values of the controlling signal and the saw-tooth signal. When adjustable signal $V_{adj}$ is equal to controlling signal $V_{ctrl}$ and the first conduction angle is $\psi_{on1}$, the duty cycle D of second square wave signal $D_{dim}$ may be at the minimum value, dimming signal $V_{ref}$ may be zero, and the LED can be off. When controlling signal $V_{ctrl}$ reaches a sum of adjustable signal $V_{adj}$ and fixed signal $V_{fix}$ and the second conduction angle is $\psi_{on2}$, the duty cycle D of second square wave signal may be at the maximum value, $V_{ref} = V_{clamp}$, and the LED can be in the maximum luminance status. During the phase angle range between $\psi_{on1}$ and $\psi_{on2}$, the duty cycle D of second square wave signal can vary continuously, and the luminance of LED may be adjusted between maximum and minimum values.

A valley of saw-tooth signal $V_{saw}$ may be up-shifted or down-shifted by regulating adjustable signal $V_{adj}$, and a peak-to-peak value may be substantially constant with the value $V_{fix}$. For example, an original dimming phase angle range may be from a phase angle of from about 60° to about 120°. At the phase angle of about 60°, $V_{ctrl} = V_{adj} + V_{fix}$, duty cycle D of the second square wave may be at the maximum value, $V_{ref} = V_{clamp}$, and the LED may accordingly be in the maximum luminance status. At the phase angle of about 120°, $V_{ctrl} = V_{adj}$, the duty cycle D of the second square wave signal may be at the minimum value, $V_{ref} = 0$, and the may accordingly be LED is in the minimum luminance status.

For example, saw-tooth signal can be up-shifted by increasing adjustable signal $V_{adj}$ to obtain a status $V_{ctrl} = V_{adj} + V_{fix}$ at a phase angle of about 45° with maximum luminance for LED. Also, a status $V_{ctrl} = V_{adj}$ at a phase angle of about 105° with minimum luminance to achieve a shift of dimming phase angle range to satisfy a different SCR element with different parameters. Thus, a luminance of the LED can be modulated between maximum and minimum luminance for various, and possibly all, conditions of different SCR elements. The dimming phase angle range can be modulated to a first half section of a sinusoidal half-wave (e.g., from about 30° to about 90°, etc.) to achieve a higher power factor.

Figure 4A:
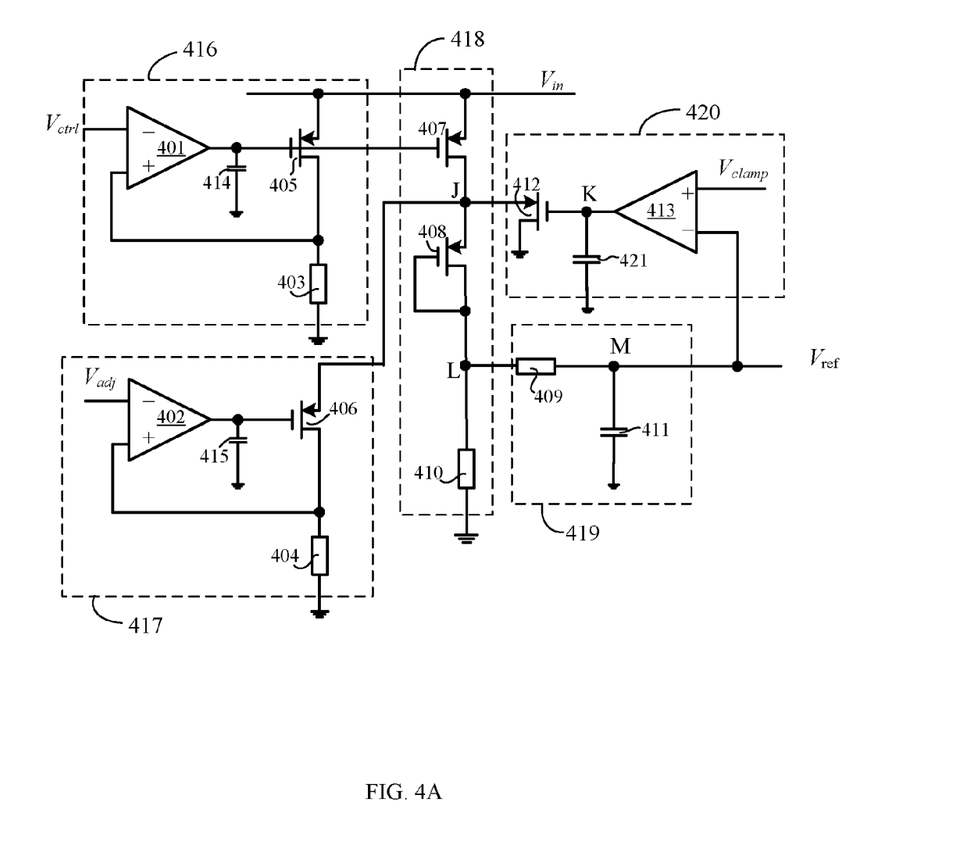
FIG. 4A is a schematic diagram of a third example SCR dimming circuit in accordance with embodiments of the present invention.

With reference to FIG. 4A, a schematic diagram illustrating an SCR dimming circuit in accordance with embodiments of the present invention is shown. Here, the conduction angle generator can be implemented, e.g., as in the example of FIG. 3, or other suitable conduction angle generator approaches. The dimming signal generator may be different from the embodiment of FIG. 3, and can include controlling signal input circuit 416, adjustable signal input circuit 417, difference calculation circuit 418, filtering circuit 419, and clamping circuit 420.

Controlling signal $V_{ctrl}$ may be converted to first current signal $I_{ctrl}$ by controlling signal input circuit 416. Adjustable signal $V_{adj}$ can be converted to second current signal $I_{adj}$ by adjusting signal input circuit 417. Difference current signal may be generated by difference calculation circuit 418 based on a difference of the first current signal $I_{ctrl}$ and the second current signal $I_{adj}$, which can be filtered by filtering circuit 419 to generate the dimming signal $V_{ref}$. Clamping circuit 420 may receive both clamping voltage $V_{clamp}$ and the dimming signal $V_{ref}$. Also, when dimming signal $V_{ref}$ is higher than clamping voltage $V_{clamp}$, dimming signal can be clamped to the clamping voltage.

Furthermore, controlling signal input circuit 416 can include amplifier 401, resistor 403, transistor 406, and filtering capacitor 414. If, for example, transistor 405 is implemented as a P-type MOSFET (PMOS) transistor, the inverting input terminal of amplifier 401 can receive controlling signal $V_{ctrl}$, and resistor 403 may be connected between non-inverting input terminal and ground. The output terminal of amplifier 401 may be coupled to one terminal of filtering capacitor 414 and gate of transistor 405. The source of transistor 405 can be coupled to input voltage $V_{in}$, and the drain of transistor 405 may be coupled to the non-inverting input terminal of amplifier 401 and resistor 403.

Current flowing through transistor 405 and resistor 403 can be determined according to formula (8) in accordance the "virtual short circuit" amplifier principal.

$$I_{ctrl} = V_{ctrl}/R_{403} \quad (8)$$

Adjustable signal input circuit 417 can include amplifier 402, resistor 404, transistor 406, and filtering capacitor 415. If transistor 406 is also implemented as a PMOS transistor, the inverting input terminal of amplifier 402 may receive adjustable signal $V_{adj}$, and resistor 404 may be connected between the non-inverting input terminal of amplifier 402 and ground. The output terminal of amplifier 402 may be coupled to one terminal of filtering capacitor 415 and gate of transistor 406. The drain of transistor 406 may be coupled to the non-inverting input terminal of amplifier 402, and to resistor 404.

Current flowing through transistor 406 and resistor 404 can be determined using formula (9) in accordance with the "virtual short circuit" amplifier principal.

$$I_{adj} = V_{adj}/R_{404} \qquad (9)$$

Difference calculation circuit 418 can include transistor 407, transistor 408 and resistor 410. For example, transistors 407 and 408 may be implemented as PMOS transistors, and the gate of transistor 407 may be coupled to the gate of transistor 405. The source of transistor 407 may be coupled to input voltage $V_{in}$, while the drain can be coupled to the source of transistor 408 at common node J, and the source of transistor 406. The gate of transistor 408 may be coupled to drain of transistor 408. Resistor 410 can be coupled between the drain of transistor 408 at common node L and ground.

Current $I_{ctrl}$ through transistor 405 may be mirrored by transistor 407 such that first current signal $I_{ctrl}$ flows through the drain of transistor 407. First current signal $I_{ctrl}$ and second current signal $I_{adj}$ may flow though node J, and as such current with a value of difference between the first current signal $I_{ctrl}$ and the second current signal $I_{adj}$ ($I_{ctrl}-I_{adj}$) can flow through the drain of transistor 408 when the gate and drain of transistor 408 are connected together.

Filtering circuit 419 can include resistor 409 and capacitor 411, which may be coupled in series with common node M. One terminal of resistor 409 can be coupled to node L, while the other terminal may be coupled to one terminal of capacitor 411. Also, the other terminal of capacitor 411 can be grounded.

A voltage of node L may be filtered by filtering circuit 419 to generate the dimming signal at node M. Clamping circuit 420 can include amplifier 413, transistor 412, and compensating capacitor 421. Here, the non-inverting input terminal of amplifier 413 can receive clamping voltage $V_{clamp}$, inverting input terminal may receive dimming signal $V_{ref}$, and the output terminal may be coupled to the gate of transistor 412. The drain of transistor 412 can be grounded, and the source of transistor 412 may be coupled to node J. Also, one terminal of compensating capacitor 421 can be coupled to common node K of amplifier 413 and transistor 412, while the other terminal may be coupled to ground.

When dimming signal $V_{ref}$ is higher than clamping voltage $V_{clamp}$, a voltage of output terminal of amplifier 413 can decrease, and first current signal $I_{ctrl}$ may flow through transistor 412, thus causing a decrease of voltage at node L to clamp dimming signal $V_{ref}$ to clamping voltage $V_{clamp}$. If the resistance of both resistor 403 and resistor 404 are substantially the same, dimming signal $V_{ref}$ can be represented as in formula (10):

$$V_{ref} = \min(V_{clamp}, \max(0, ((V_{ctrl}-V_{adj}) \times R_{410}/R_{403}))) \qquad (10)$$

Figure 4B:
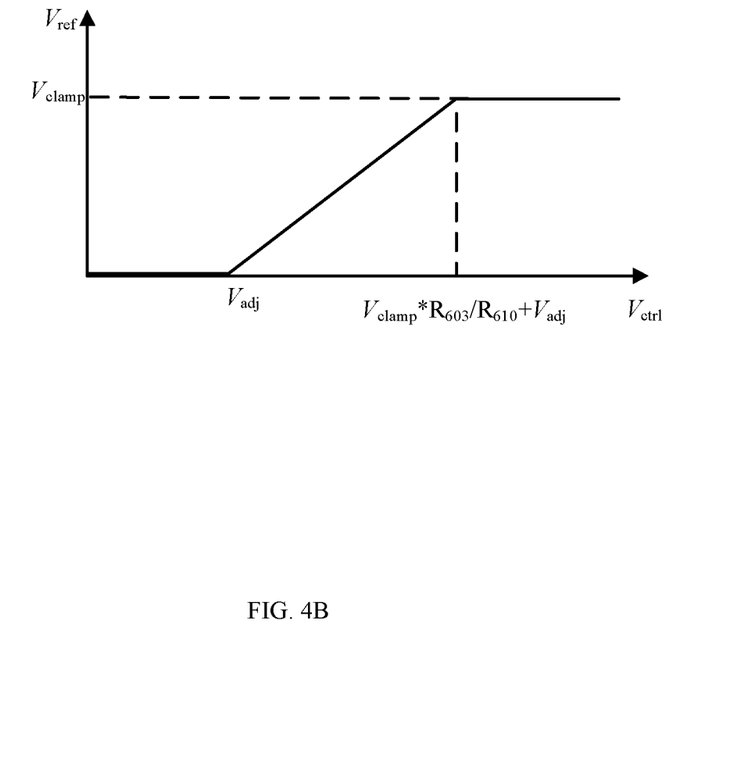
FIG. 4B is a waveform diagram showing example operation of the SCR dimming circuit of FIG. 4A, in accordance with embodiments of the present invention.

An example relationship of dimming signal $V_{ref}$, clamping voltage $V_{clamp}$, controlling signal $V_{ctrl}$ and adjustable signal $V_{adj}$ may be as illustrated as FIG. 4B. When adjustable signal $V_{adj}$ is higher than controlling signal $V_{ctrl}$, dimming signal $V_{ref}=0$, and the LED may be in a minimum luminance status.

When adjustable signal $V_{adj}$ is less than controlling signal $V_{ctrl}$, and higher than a value of $V_{ctrl}-V_{clamp} \times R_{403}/R_{410}$ dimming signal $V_{ref}$ may be between zero and clamping voltage $V_{clamp}$, and the luminance of the LED can be between the maximum and minimum values. In the dimming status, the value of dimming signal can be expressed as in formula (11):

$$V_{ref} = (V_{ctrl}-V_{adj}) \times R_{410}/R_{403}$$

When adjustable signal $V_{adj}$ is equal to value of $V_{adj}=V_{pi} \cdot \phi/\pi$, $V_{ref}$ may be zero and the LED can be in the minimum luminance status. When adjustable signal $V_{adj}$ is equal to $V_{adj}=V_{ctrl}-V_{clamp} \times R_{403}/R_{410}$, $V_{ref}=V_{clamp}$, the LED may be in the maximum luminance status. When adjustable signal $V_{adj}$ is less than $V_{ctrl}-V_{clamp} \times R_{403}/R_{410}$, $V_{ref}=V_{clamp}$, the LED can be the maximum luminance status.

The cut-off phase angle may be modulated by regulation of adjustable signal $V_{adj}$, and a phase angle at which luminance is a maximum value can be regulated correspondingly to achieve regulation of the dimming phase angle range. For example, if the original dimming phase angle range is from about 60° to about 120°, the controlling signal $V_{ctrl}$ can be expressed as in formula (12).

$$V_{ctrl} = V_{adj} + \frac{V_{clamp} \times R_{403}}{R_{410}} \qquad (12)$$

At a phase angle of about 60°, $V_{ref}=V_{clamp}$, the LED may be in a maximum luminance status. At a phase angle of about 120°, $V_{ctrl}=V_{adj}$, $V_{ref}=0$, the LED may be in a minimum luminance status. For example, by increasing adjustable signal $V_{adj}$, at the phase angle 45°, controlling signal $V_{ctrl}$ may be equal to the value of formula (13), $$V_{ctrl} = V_{adj} + \frac{V_{clamp} \times R_{403}}{R_{410}} \qquad (13)$$

The LED may be in a maximum luminance status, but at a phase angle of about 105°, $V_{ctrl}=V_{adj}$, the LED in the minimum luminance status. The dimming phase angle range can be shifted to satisfy different SCR elements with different parameters. The luminance of the LED can be modulated between maximum and minimum luminance for all SCR elements. The dimming phase angle range can be modulated to the first half section of sinusoidal half-wave, such as in a range of from about 30° to about 90°, in order to achieve a higher power factor.

One example SCR dimming method will be described herein. For example, an SCR dimming method for regulating luminance of an LED load, can include: (i) converting an external sinusoidal AC power supply to a lack-phase AC voltage; (ii) converting the lack-phase AC voltage to a lack-phase DC voltage; (iii) converting the lack-phase DC voltage to a controlling signal representing a conduction angle of an SCR element; (iv) generating a dimming signal in response to the controlling signal, an adjustable signal, and a clamping voltage; (v) selecting an amplitude of a dimming phase angle range a fixed signal that is determined by the clamping voltage; and (vi) shifting the dimming phase angle range by regulating the adjustable signal.

Figure 5:
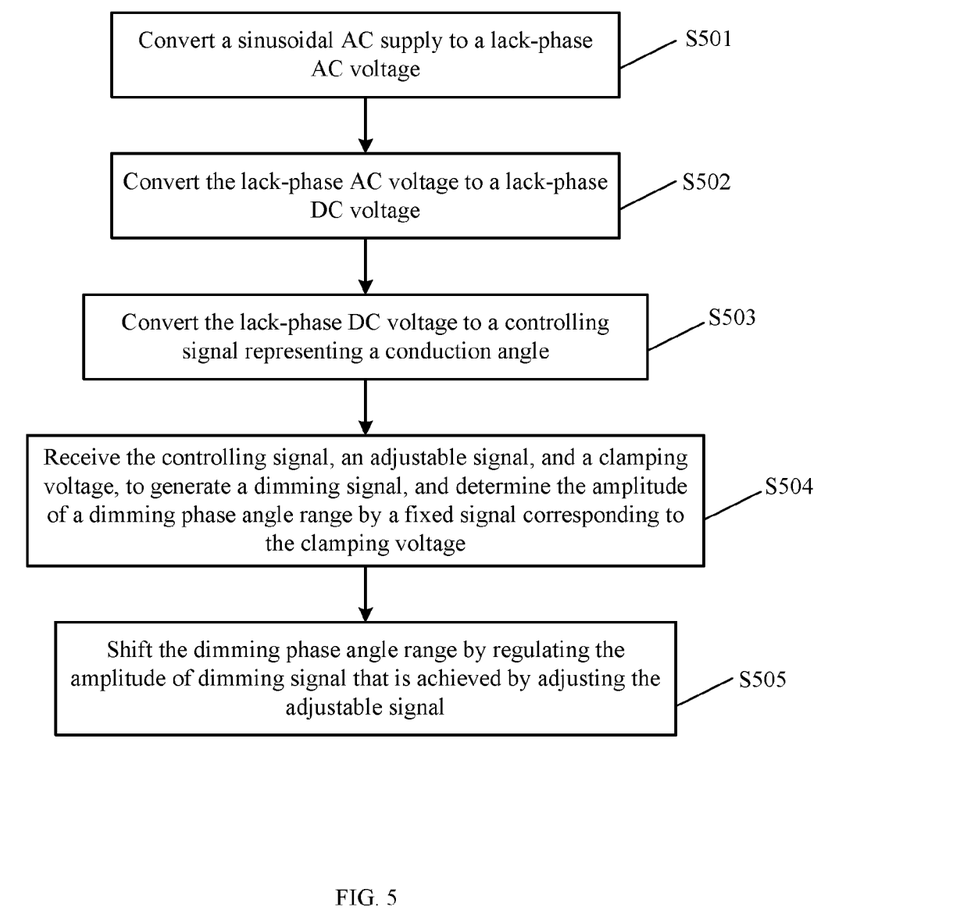
FIG. 5 is a flow chart showing an SCR dimming method in accordance with embodiments of the present invention.

With reference to FIG. 5, an SCR dimming method in accordance with embodiments of the present invention is illustrated. In this example at S501, a sinusoidal AC power supply may be converted to a lack-phase AC voltage. At S502, the lack-phase AC voltage may be converted to generate a lack-phase DC voltage. At S503, the lack-phase DC voltage may be converted to a controlling signal representative of a conduction angle.

At S504, the controlling signal, an adjustable signal, and a clamping voltage can be received, and may be used to generate a dimming signal, and also to determine the amplitude of a dimming phase angle range by a fixed signal corresponding to the clamping voltage. At S505, the dimming phase angle range may be shifted by regulating the amplitude of the dimming signal, which can be achieved by adjusting the adjustable signal.

When adjustable signal $V_{adj}$ is higher than controlling signal $V_{ctrl}$, dimming signal may be at a minimum value, and the LED is off, or in minimum luminance status. When the difference between controlling signal $V_{ctrl}$ and adjustable signal $V_{adj}$ is higher than fixed signal $V_{fix}$, the dimming signal may be at a maximum value, and the LED can be in maximum luminance status. When adjustable signal $V_{adj}$ is higher than a difference between controlling signal $V_{ctrl}$ and fixed signal $V_{fix}$, and less than controlling signal $V_{ctrl}$, the dimming signal may vary continuously between maximum and minimum values, and the LED can be in a dimming status between minimum luminance and maximum luminance.

Furthermore, the generation of the controlling signal can include: clamping and comparing the lack-phase DC voltage to generate a first square wave signal indicating conduction angle. In addition, the first square wave signal may be filtered to generate a controlling signal in proportion with the conduction angle.

The dimming signal generation can include comparing the controlling signal and a saw-tooth signal to generate second square wave signal. Also, the second square wave signal may be averaged to generate the dimming signal. Further, saw-tooth signal generation can include receiving a fixed signal and the adjustable signal to generate a saw-tooth signal with a valley as the adjustable signal and a peak as a sum of both the fixed signal and the adjustable signal.

Dimming signal generation can include converting the controlling signal to first current signal. Also, the adjustable signal may be converted to a second current signal. Also, the difference between first current signal and second current signal may be calculated to generate a difference current signal. The difference current signal may be filtered to generate the dimming signal. The dimming signal generation can further include clamping the dimming signal based on the clamping voltage. For example, when the dimming signal is higher than the clamping voltage, the dimming signal may be clamped to the clamping voltage.

In one embodiment, an LED driver can include: (i) the SCR dimming circuit; and (ii) a power stage coupled, via an output voltage, to an LED; (iii) an error amplifying circuit configured to receive the dimming signal and a feedback signal representative of the output voltage, and to generate an error signal; and (iv) a logic and driving circuit configured to receive the error signal, and to generate a driving signal to drive the power stage, where a luminance of the LED is configured to be regulated by the dimming signal.

Figure 6:
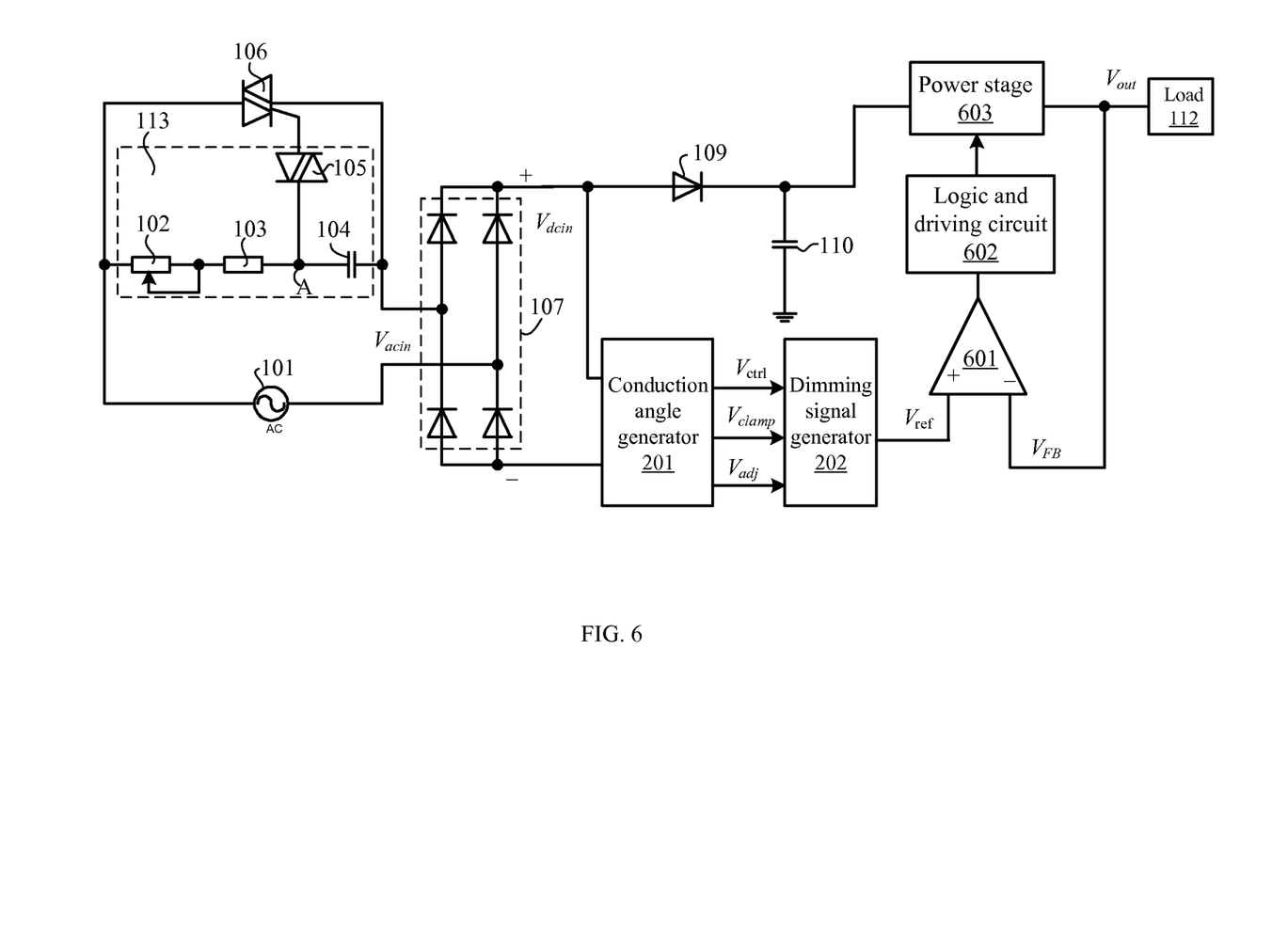
FIG. 6 is a schematic diagram of an example LED driver in accordance with embodiments of the present invention.

With reference to FIG. 6, an LED driver in accordance with embodiments of the present invention is illustrated. In this particular example, the LED driver can include SCR element 106, trigger circuit 113, rectifier bridge 107, SCR dimming circuit, power stage 603, logic and driving circuit 602, and error amplifying circuit 601. SCR element 106 and trigger circuit 113 may receive an external sinusoidal AC voltage to generate a lack-phase AC voltage. Rectifier bridge 107 can convert the lack-phase AC voltage $V_{acin}$ to a lack-phase DC voltage $V_{dcin}$. The SCR dimming circuit may receive the lack-phase DC voltage to generate a dimming signal $V_{ref}$.

Error amplifying circuit 601 can be used to amplify a difference between dimming signal $V_{ref}$ and feedback signal $V_{FB}$ indicating an output voltage of power stage, which can be coupled to logic and driving circuit 602 through an output terminal. A corresponding driving signal can be generated by logic and driving circuit 602 to control power stage 603 to generate an output voltage to drive LED 112, and the luminance of the LED can be modulated in accordance with dimming signal $V_{ref}$.

An SCR dimming circuit as described herein can be one of the examples as shown and discussed above with reference to FIG. 2, FIG. 3A, FIG. 3B and/or FIG. 4, in accordance with embodiments of the present invention. The power stage can be any suitable topology type (e.g., flyback, buck, boost, etc.). In any event, the dimming phase angle can be selected and modulated by regulating an adjustable signal in accordance with the SCR dimming circuits and methods as described herein.

The foregoing descriptions of specific embodiments of the present invention have been presented through images and text for purpose of illustration and description of the SCR dimming circuit and method. They are not intended to be exhaustive or to limit the invention to the precise forms disclosed, and obviously many modifications and variations are possible in light of the above teaching, such as variable numbers of the current mirror, and alternatives types of transistors, filtering circuits, and triggering circuits for different applications.

The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A silicon-controlled rectifier (SCR) dimming circuit, comprising:
  a) an SCR element configured to generate a lack-phase AC voltage based on a sinusoidal AC supply;
  b) a rectifier bridge configured to generate a lack-phase DC voltage based on said lack-phase AC voltage;
  c) a conduction angle generator coupled to said rectifier bridge, wherein said conduction angle generator is configured to receive said lack-phase DC voltage, and to generate a controlling signal that is representative of a conduction angle of said SCR element; and
  d) a dimming signal generator coupled to said conduction angle generator and being configured to generate a dimming signal to regulate luminance of a light-emitting diode (LED) load in accordance with said lack-phase DC voltage, wherein said dimming signal generator is configured to receive said controlling signal, an adjustable signal, and a clamping voltage, wherein an amplitude of a dimming phase angle range is selected by a fixed signal determined by said clamping voltage, and wherein said dimming phase angle range is configured to be shifted by regulating said adjustable signal.

2. The SCR dimming circuit of claim 1, wherein:
  a) said dimming signal is at a minimum value to make said LED in a minimum luminance status when said adjustable signal is higher than said controlling signal;
  b) said dimming signal is at a maximum value to make said LED in a maximum luminance status when a difference between said controlling signal and said adjustable signal is higher than said fixed signal; and
  c) said dimming signal is between said minimum value and said maximum value, and said LED luminance is between said minimum luminance status and said maximum luminance status, when said adjustable signal is between said controlling signal and a difference of said controlling signal and said fixed signal.

3. The SCR dimming circuit of claim 1, wherein said conduction angle generator comprises:
 a) a phase angle detector coupled to said rectifier bridge, wherein said phase angle detector is configured to receive said lack-phase DC voltage, and to generate a detection voltage; and
 b) a controlling signal generator coupled to said phase angle detector, wherein said controlling signal generator is configured to receive said detection voltage, and to generate a smooth controlling signal that indicates said conduction angle of said SCR element.

4. The SCR dimming circuit of claim 3, wherein said phase angle detector comprises:
 a) a zener diode, wherein an anode of said zener diode is coupled to a second output terminal of said rectifier bridge, and a cathode of said zener diode is coupled to a first output terminal of said rectifier bridge through a first resistor; and
 b) a first transistor, wherein a controlling terminal of said first transistor is coupled to said cathode of said zener diode, a first terminal of said first transistor is coupled to said first output terminal of said rectifier bridge, and a second terminal of said first transistor is coupled to ground through a second resistor.

5. The SCR dimming circuit of claim 3, wherein said controlling signal generator comprises:
 a) a square wave signal generator coupled to said phase angle detector, wherein said square wave signal generator is configured to receive said detection voltage, and to generate a first square wave signal that indicates said conduction angle of said SCR element; and
 b) a filtering circuit coupled to said square wave signal generator, wherein said filtering circuit is configured to filter said first square wave signal, and to generate said controlling signal in proportion with said conduction angle of said SCR element.

6. The SCR dimming circuit of claim 5, wherein said square wave signal generator comprises a current comparator having first and second terminals, wherein said first current comparator terminal is configured to receive a current signal that indicates said detection voltage, and wherein said second current comparator terminal is configured to receive a current reference, and to generate said first square wave signal that indicates said conduction angle of said SCR element.

7. The SCR dimming circuit of claim 5, wherein said square wave signal generator comprises a voltage comparator configured to compare said detection voltage and a voltage reference, and to generate said first square wave signal that indicates said conduction angle of said SCR element.

8. The SCR dimming circuit of claim 5, wherein said controlling signal generator comprises:
 a) a first inverter configured to receive said first square wave signal; and
 b) a first filtering circuit having a resistor and a capacitor that are coupled in series between an output of said first inverter and said second output terminal of said rectifier bridge, wherein a voltage at a common node of said resistor and said capacitor is configured as said controlling signal.

9. The SCR dimming circuit of claim 1, wherein said dimming signal generator comprises a first comparator and an averaging circuit, and wherein:
 a) said controlling signal is coupled to a first input terminal of said first comparator, and a saw tooth signal is coupled to second input terminal of said first comparator, and said first comparator is configured to a second square wave signal at an output terminal of said first comparator;
 b) an amplitude of said dimming phase angle range is determined by a peak-to-peak value of said saw tooth signal; and
 c) said averaging circuit is coupled to said first comparator, wherein said averaging circuit is configured to receive said second square wave signal and said clamping voltage, and to generate said dimming signal.

10. The SCR dimming circuit of claim 9, wherein said dimming signal generator comprises a saw tooth signal generator configured to receive said fixed signal and said adjustable signal, and to generate said saw tooth signal, wherein said saw tooth signal comprises a valley as said adjustable signal and a peak as a sum of said fixed signal and said adjustable signal.

11. The SCR dimming circuit of claim 9, wherein said averaging circuit comprises a second inverter, a second transistor, and third transistor coupled in series between said clamping voltage and ground, and a second filtering circuit, and wherein:
 a) an input terminal of said second inverter is configured to receives said second square wave signal, and an output terminal of said second inverter is coupled to a controlling terminal of said third transistor;
 b) a controlling terminal of said second transistor is configured to receive said second square wave signal; and
 c) second filtering circuit comprises a resistor and a capacitor coupled in series between said second transistor and said third transistor, and a voltage of a common node of said resistor and said capacitor is configured as said dimming signal.

12. The SCR dimming circuit of claim 1, wherein said dimming signal generator comprises:
 a) a controlling signal input circuit configured to convert said controlling signal to a first current signal;
 b) an adjustable signal input circuit configured to convert said adjustable signal to a second current signal;
 c) a difference calculation circuit configured to calculate a difference between said first current signal and said second current signal, and to generate a difference current signal;
 d) a filtering circuit configured to filter said difference current signal to generate said dimming signal; and
 e) a clamping circuit configured to receive said clamping voltage and said dimming signal, and to clamp said dimming signal to said clamping voltage when said dimming signal is higher than said clamping voltage.

13. The SCR dimming circuit of claim 12, wherein said difference calculation circuit comprises a current comparator having a fourth transistor and a fifth transistor coupled in series between an input voltage and ground, and wherein:
 a) said fourth transistor is configured to receive said first current signal;
 b) said fifth transistor is configured to receive said second current signal; and
 c) a controlling terminal and a second terminal of said fifth transistor are coupled together to generate said difference current signal at said second input terminal of said fifth transistor.

14. A silicon-controlled rectifier (SCR) dimming method, the method comprising:
 a) converting an external sinusoidal AC power supply to a lack-phase AC voltage;

b) converting said lack-phase AC voltage to a lack-phase DC voltage;
c) converting said lack-phase DC voltage to a controlling signal representing a conduction angle of an SCR element;
d) generating a dimming signal in response to said controlling signal, an adjustable signal, and a clamping voltage;
e) selecting an amplitude of a dimming phase angle range a fixed signal that is determined by said clamping voltage; and
f) shifting said dimming phase angle range by regulating said adjustable signal.

15. The method of claim 14, wherein:
a) said dimming signal is at a minimum value to make a light-emitting diode (LED) in a minimum luminance status when said adjustable signal is higher than said controlling signal;
b) said dimming signal is at a maximum value to make said LED in a maximum luminance status when a difference between said controlling signal and said adjustable signal is higher than said fixed signal; and
c) said dimming signal is between said minimum value and said maximum value, and said LED luminance is between said minimum luminance status and said maximum luminance status, when said adjustable signal is between said controlling signal and a difference of said controlling signal and said fixed signal.

16. The method of claim 14, further comprising:
a) comparing and clamping said lack-phase DC voltage to generate a first square wave signal representing said conduction angle of said SCR element; and
b) filtering said first square wave signal to generate said controlling signal in proportion with said conduction angle of said SCR element.

17. The method of claim 14, further comprising:
a) comparing said controlling signal with a saw tooth signal to generate a second square wave signal; and
b) averaging said second square wave signal and said clamping voltage to generate said dimming signal.

18. The method of claim 17, further comprising generating said saw tooth signal from said adjustable signal and said fixed signal, wherein said saw tooth signal comprises a valley as said adjustable signal and a peak as a sum of said fixed signal and said adjustable signal.

19. The method of claim 14, further comprising:
a) converting said controlling signal to a first current signal;
b) converting said adjustable signal to a second current signal;
c) calculating a difference between said first current signal and said second current signal to generate a difference current signal;
d) filtering said difference current signal to generate said dimming signal; and
e) clamping said dimming signal to said clamping voltage when dimming signal is higher than said clamping voltage.

20. A light-emitting diode (LED) driver, comprising:
a) said SCR dimming circuit of claim 1;
b) a power stage coupled, via an output voltage, to an LED;
c) an error amplifying circuit configured to receive said dimming signal and a feedback signal representative of said output voltage, and to generate an error signal; and
d) a logic and driving circuit configured to receive said error signal, and to generate a driving signal to drive said power stage, wherein a luminance of said LED is configured to be regulated by said dimming signal.

* * * * *